March 20, 1951
C. W. BERTHIEZ
MACHINE TOOL FOR THE MACHINING
OF LARGE ANNULAR WORKPIECES
Filed Dec. 9, 1949
2,545,838
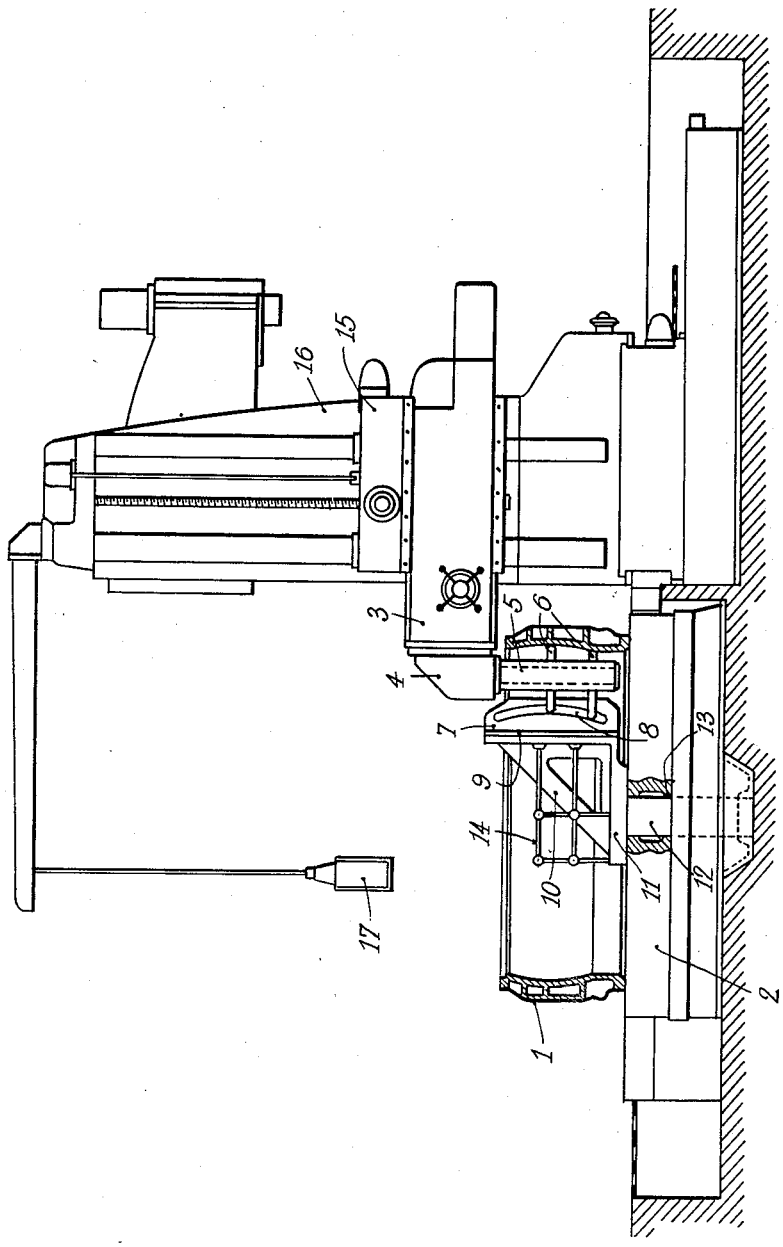
INVENTOR
Charles William Berthiez
By George H. Covely
ATTORNEY Patented Mar. 20, 1951

2,545,838

UNITED STATES PATENT OFFICE 2,545,838

MACHINE TOOL FOR THE MACHINING OF LARGE ANNULAR WORKPIECES

Charles William Berthiez, Paris, France

Application December 9, 1949, Serial No. 132,022
In France December 14, 1948

5 Claims. (Cl. 77—1)

When it is desired to machine large annular workpieces, they are generally clamped upon the conventional rotary table of vertical turning and boring mills.

The applicant has also suggested, in his copending application, Serial No. 121,941, filed on October 18, 1949, and relative to "Universal Machine-Tool" to use a machine of the milling and boring type fitted with a horizontal rotary table on which the workpiece is clamped.

In this type of operation the workpiece is rotatably driven with respect to the tool which receives only a feeding movement.

Under these conditions it is rather difficult to tend the work and to control the movements of the tool.

In fact if the operator were outside the workpiece and on the rotary table he would turn therewith and his position would be very dangerous, besides he could not supervise the tool. If he were outside the rotary table he would not turn therewith but he would be too far from the tool and his position would also be inadequate for supervising the work.

Furthermore, when the operation to be performed on the workpiece is an internal one, it is apparent that the operator cannot follow the machining process if he stands out of the workpiece whether he is on the table or not.

The operator has still another possibility which consists in placing himself inside the work-piece but since in this case also he would also turn with the workpiece he would be unable to observe the progression of the work with accuracy.

The object of the present invention is to obviate the above described difficulties by enabling the operator, although inside the annular workpiece placed on the rotary table, to remain standing and close to the working zone of the tool.

According to the invention a machine-tool provided with a rotary work-piece carrying table comprises, in the central portion of this table, a stand or bracket for the operator supported by a fixed column extending through a central bore provided in the rotary table; the operator may place himself on this stand and thus conveniently supervise and control the machining performed on a large annular workpiece clamped on the machine table.

According to another feature of the invention, the aforesaid stationary stand is provided with at least one supporting surface adapted to carry various attachments such as, machining headstocks or tool-heads, measuring apparatus, etc.

Other features of the invention appear in the following description with reference to the drawing the single figure of which shows diagrammatically by way of non-limitative example a machine-tool embodying the invention, the workpiece being shown in cross-section.

In the description it has been assumed that the operation to be performed was the contour-boring of a hydraulic turbine shell 1, this turning operation being effected on a universal machine-tool of the type described in said copending application Serial No. 121,941, filed on October 18, 1949, and relative to "Universal Machine-Tool." Of course, the explanations given hereafter would also apply, generally, to such cases wherein the turning operation is effected by means of a vertical lathe.

In the drawings, the figure is a side elevation of the machine, parts being in section.

The universal machine-tool shown in the drawing consists of a boring and milling machine provided with a rotary table 2 on which is clamped the turbine shell 1.

A special head 4 is mounted on the machine headstock 3 and supports an arm 5 on which a pair of tools 6 is adapted for radial sliding movement with respect to the workpiece. The radial feed of these tools is ensured by a template 7 having a groove 8 the shape of which corresponds exactly to the desired contour. Rollers (not shown) carried by shafts attached to the ends of the tools are adapted to follow this groove.

The template 7 is secured on the machined surface 9 of a large-sized bracket 10 which, according to the invention, is mainly provided for carrying the operator so that his position remains fixed while the workpiece rotates. The base plate 11 of this bracket is a stand or platform for the operator and is mounted on a column 12 extending through the central bore 13 of the table 2.

The base of the column is firmly secured to the foundation of the machine. The base plate 11 of the bracket is provided with a guard-rail 14 for the operator's safety.

The operation of the device described above is readily understandable:

The table 2 is set in rotation. The depth of cut is adjusted by controlling the position of the headstock 3 along its horizontal slideways on the supporting saddle 15 which carries it, and the tool is fed for the overall length of the cut by the vertical displacement of the headstock and its supporting saddle along the upright 16 of the machine.

With the assembly described, the cutting edge of the tools will follow a path rigorously identical to the shape of the groove of the template 7. The arrangement shown in the drawing comprises two tools 6 operating simultaneously in order to reduce machining time. The operator, standing on the platform 11 may easily supervise the work under safe conditions. Moreover, if the machine is provided with a pendant control set 17 he may control all the movements of the various parts of the machine from his stand.

Of course, the invention is not restricted to the particular embodiment described and shown solely by way of example. Thus, instead of a template 7, any other attachment or measuring apparatus might be mounted on the bracket 10.

A further advantage is that the stand 11 may be given any desired size and shape so that the operator may approach as closely as possible to that part of the workpiece which is being machined. Finally, and without going beyond the scope of the invention, the stand 11 may be adjustable both vertically and about the table's axis.

What I claim is:

1. Machine-tool with a rotary workpiece carrying table, comprising within the central portion of the rotary table, a stand or bracket for the operator, said stand or bracket being supported by a stationary column extending through a central opening provided in the rotary table.

2. Machine-tool such as claimed in claim 1, wherein said stand or bracket is provided with a horizontal platform.

3. Machine-tool such as claimed in claim 1, wherein said stand or bracket is provided with a horizontal platform which is adjustable both vertically and about the table's axis.

4. Machine-tool such as claimed in claim 1, wherein said stand or bracket is provided with at least one surface adapted to support various tools or measuring devices.

5. Machine-tool such as claimed in claim 1, wherein the machine is provided with a remote control device such as a pendant control box which the operator can manipulate from his stand.

CHARLES WILLIAM BERTHIEZ.

No references cited.